E. A. PETERSON.
KNIFE BAR FOR BEATING ENGINES.
APPLICATION FILED OCT. 13, 1915.
1,216,487.
Patented Feb. 20, 1917.
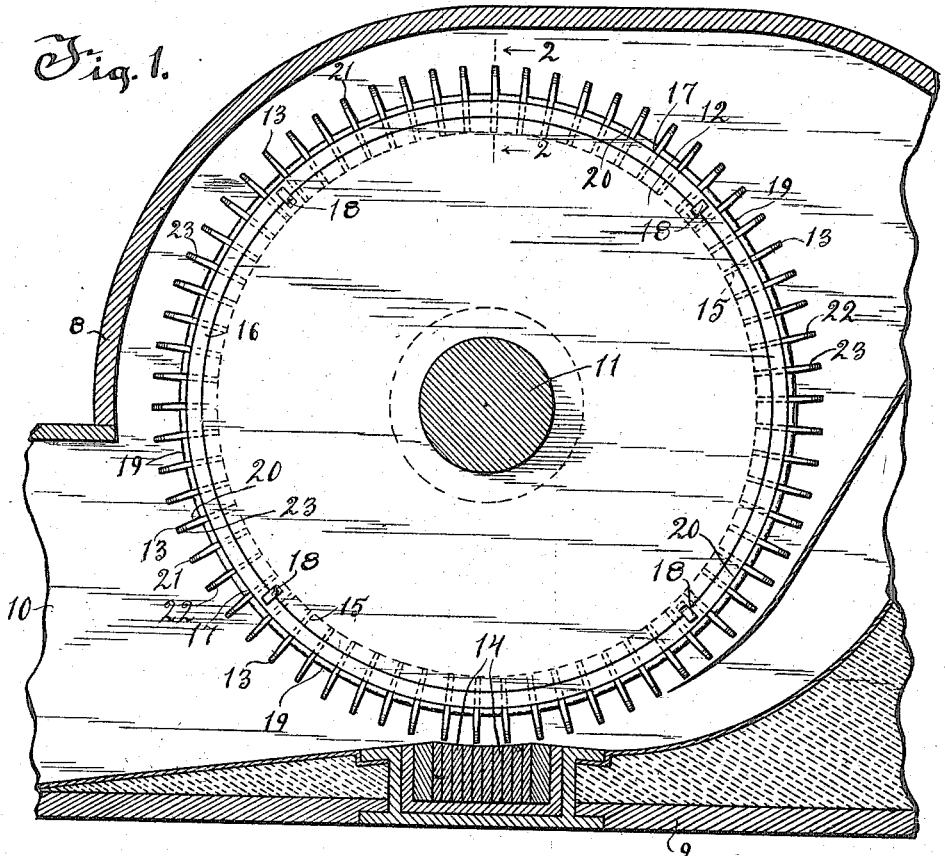
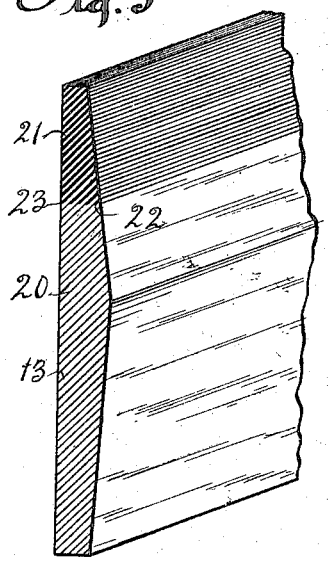
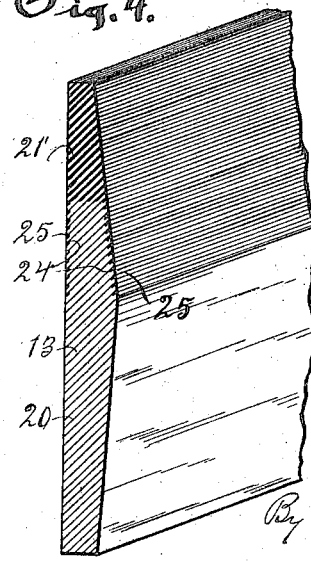
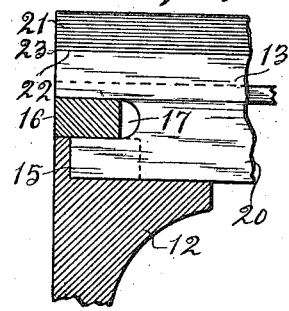
INVENTOR
Emil A. Peterson
By Morsell, Keeney & French,
ATTORNEYS.

UNITED STATES PATENT OFFICE.

EMIL A. PETERSON, OF APPLETON, WISCONSIN.

KNIFE-BAR FOR BEATING-ENGINES.

1,216,487. Specification of Letters Patent. Patented Feb. 20, 1917.

Application filed October 13, 1915. Serial No. 55,604.

*To all whom it may concern:*

Be it known that I, EMIL A. PETERSON, a citizen of the United States, and resident of Appleton, in the county of Outagamie and State of Wisconsin, have invented new and useful Improvements in Knife-Bars for Beating-Engines, of which the following is a description, reference being had to the accompanying drawings, which are a part of this specification.

This invention relates to improvements in knife bars for beating engines.

In the paper making art the half or coarse pulp or other material is passed through a beating engine to be shredded or reduced to a finer pulp and in being worked, the material or stock is mixed with water to form a semi-liquid mass which is ordinarily contained within an oval shaped partitioned vat provided with a rotary reducing drum which extends transversely of the vat. The drum is provided with a series of peripheral longitudinally extending knife bars which coact with fixed knives mounted in the bottom portion of the vat immediately below the drum. The stock is caused to flow between the reducing drum and the coacting fixed member positioned below the reducing member and is shredded or reduced in passing therethrough.

The knife bars are sometimes formed of bronze which is the most satisfactory metal for the purpose, but due to the very high cost of the bronze metal they are in most cases formed of steel. In the use of bronze knife bars the bronze material is especially rolled for the purpose to produce a very hard grade which tends to preserve its square edge in use and therefore produces a fine grade of pulp during the life of the knife bars. The knife bars are four to five feet in length and approximately five and a half inches deep and one half inch thick, and from sixty-six to eighty knives are used in forming a drum. The knife bars are usually scrapped after the outer working edges have been worn off approximately one-fourth the depth of the bar and consequently three fourths of each bar is scrapped. As the bronze bars cost from fifteen to nineteen dollars each it will be seen that the original and maintenance cost for each drum provided with bronze knife bars is very high when compared with drums provided with steel knives which cost approximately one dollar and a half for each knife bar.

As before stated steel knife bars are ordinarily used to lessen the cost but they have been found very unsatisfactory in use due to the fact that in use the steel knife bar tends to wear to a sharp knife like edge which cuts the fiber of the pulp material instead of pulling it apart therefore producing an inferior grade of pulp. Furthermore the working steel edges of the bars are effected by the acids of the pulp and rapidly pit and deteriorate in use and particles of the metal chip off and discolor the pulp and otherwise deleteriously affect the paper made therefrom and the machines through which the pulp material passes in the course of manufacture.

It is one of the objects of the present invention to overcome the before mentioned objectionable features and provide a knife bar for a beating engine which possesses all of the features of advantage of the bronze bar and which may be manufactured at a minimum cost.

A further object of the invention is to provide a knife bar for a beating engine which is of simple construction, is strong and durable and is well adapted for the purpose described.

With the above and other objects in view the invention consists of the improved knife bar for beating engines and its parts and combinations as set forth in the claims and all equivalents thereof.

In the accompanying drawing in which the same reference characters indicate the same parts in all of the views:

Figure 1 is a longitudinal sectional view of a portion of a beating engine provided with the improved knife bars;

Fig. 2 is a longitudinal sectional detail view thereof on a larger scale taken on line 2—2 of Fig. 1;

Fig. 3 is a transverse sectional detail view on a larger scale of one of the knife bars; and Fig. 4 is a similar view of a modified form of knife bar.

Referring to the drawing the numeral 8 indicates a beating engine which comprises a vat 9 of oval form divided medially of its width by a partition 10 which extends for a portion of the length of the vat and is spaced from the end portion of the vat to form a continuous passageway for the stock to travel around the partition while being worked. A shaft 11 extends transversely of the vat and has mounted thereon a rotary beating drum 12 which is positioned between the medial partition and one side of the vat and the lower portion of the drum extends into the vat to a point adjacent to the bottom portion of the vat. The drum is provided with longitudinally extending knife bars 13 around its periphery which coact with the fixed knife bars 14 mounted in the bottom portion of the vat beneath the drum. The stock being worked passes between the knife bars of the drum and the fixed knife bars of the vat in its passage around the vat. The knife bars 13 are mounted in grooved portions 15 of the drum and are held in position by means of metal rings 16 (only one being shown) which surround end portions of the drum and enter recesses 17 formed in the opposite ends of the knife bars. Locking keys 18 hold the rings in position and strips of wood 19 extending lengthwise of the knife bars and wedged therebetween serve to tightly clamp and hold the knife bars in position on the drum.

The base or major portion 20 of each knife bar 13 is formed of steel or other like metal and the working edge portion, which in some cases will approximate one fourth of the depth of the bar, is formed of a hard rolled bronze or other non-ferrous metal 21. The two unlike metals of the knife bar are welded together along their adjacent edges 22 preferably by the oxyhydrogen welding process which forms an integral connection 23 between the two parts of sufficient strength to withstand the hard usage to which the knife bars are subjected while in use. The bronze portion 21 is of a depth approximately corresponding to the depth of the portion of the knife bar subjected to wear thus providing a bar having all of the features of advantage of a bronze bar at approximately one-half to one third the cost of the bronze knife bar.

In the modified form shown in Fig. 4 the steel or other ferrous portion of the bar is recessed or formed of less thickness along its outer edge portion, as indicated by the numeral 24, and the bronze or non-ferrous portion 21′ of the bar is welded thereto as before mentioned, and in welding a portion of the bronze or other non-ferrous metal or flux is caused to flow over and fill the recessed portions of the ferrous metal as indicated by the numeral 25 thus forming wings or extensions of said bronze portion which cover the portion of the steel projecting outwardly beyond the outer edges of the wedging strips of wood 19.

In both forms the surplus flux or melted metal is ground or otherwise removed to form a smooth finished appearance.

From the foregoing description it will be seen that the improved knife bars are well adapted for the purpose described.

What I claim as my invention is:

1. A knife bar for a beating engine, consisting of a base portion formed of an elongated bar of steel having a working edge portion formed of an elongated bar of bronze welded to the bar of steel.

2. A two part knife bar for a beating engine; consisting of an elongated strip of material formed of ferrous and non-ferrous strips of metal welded together longitudinally of their lengths, the non-ferrous strip of metal having an extension which partly covers and is welded to one side portion of the ferrous strip of metal.

3. A two part knife bar for a beating engine, consisting of an elongated strip of material formed of bronze and steel strips of metal welded together longitudinally of their lengths, the steel strip having recessed side portions and the bronze strip having side extensions which enter the side recesses of the steel strip and are welded to said steel strip.

4. A knife bar for a beating engine, consisting of a base portion formed of an elongated strip of steel having a medial portion of greater thickness than its opposite side edge portions and a working edge portion formed of a strip of bronze of less width than the base welded throughout its length to one of the side edges of the base portion.

5. A knife bar for a beating engine, consisting of a base portion formed of an elongated strip of steel having one flat side and the other side being of angular form transversely, the thickest portion of the strip being medially of its width, and a strip of bronze of less width than the base portion welded edgewise to one side edge of the base portion to form a working edge portion.

In testimony whereof, I affix my signature in presence of two witnesses.

EMIL A. PETERSON.

Witnesses:
P. K. THORN,
M. McMAHON.

Copies of this patent may be obtained for five cents each, by addressing the "Commissioner of Patents, Washington, D. C."